United States Patent [19]
Schippers

[11] 3,782,870
[45] Jan. 1, 1974

[54] APPARATUS FOR EXTRUDING A PARTIALLY FOAMED THERMOPLASTIC PRODUCT

[75] Inventor: Heinz Schippers, Remscheid, Germany

[73] Assignee: Barmag Barmer Maschinenfabrik Aktiengesellschaft, Wuppertal, Germany

[22] Filed: Feb. 24, 1972

[21] Appl. No.: 229,074

[30] Foreign Application Priority Data
Feb. 25, 1971 Germany............................ 2108936

[52] U.S. Cl............. 425/4 C, 425/817 C, 425/133, 264/47
[51] Int. Cl............................................ B29d 27/00
[58] Field of Search.................... 164/79; 264/47; 425/4 C, 131, 133, 462, 817 C

[56] References Cited
UNITED STATES PATENTS
484,777   10/1892   Chase .................................. 425/133
3,189,941  6/1965   Reifenhauser ....................... 425/133
3,256,562  6/1966   Heard, Jr. ............................ 425/133
3,266,093  8/1966   Corbett................................ 425/133
3,314,108  4/1967   Wienand et al...................... 425/133

FOREIGN PATENTS OR APPLICATIONS
700,412   12/1964   Canada............................... 425/4 C Primary Examiner—R. Spencer Annear
Attorney—John H. Shurtleff et al.

[57] ABSTRACT

Process and apparatus for producing a partially foamed thermoplastic polymer product in a single screw extruder by dividing an initial melt stream of the polymer into separate partial melt streams conveyed individually by the extruder to a shaping or forming die, uniformly mixing a foaming agent with at least one but not all of the separate and individually conveyed partial melt streams, and then rejoining all of said melt streams in the die in abutting core and shell layers with foaming of at least one but not all of said layers.

19 Claims, 7 Drawing Figures

APPARATUS FOR EXTRUDING A PARTIALLY FOAMED THERMOPLASTIC PRODUCT

Processes are known according to which shaped articles or bodies with a foamed core and a cover layer or shell of thermoplastic material are produced by continuous extrusion, for example those processes in which one polymer melt containing the foaming agent and another polymer melt free of the foaming agent must be processed in separately arranged screw extruders (see German Pat. No. 1,183,238 and French Pat. No. 1,541,608). The individual screw extruders required for each of the polymer melts are assembled into a composite installation by connecting all the extruders to a common shaping die. By means of a die provided with several extrusion nozzles or orifices, the melt containing the foaming agent and the melt free of foaming agent are pressed out and shaped in a connected calibrating or sizing device, a vacuum additionally being applied to act on the shaped body as it is formed (see German Pat. No. 1,154,264).

It is a serious disadvantage in the known types of apparatus for the production of such semifinished and partly foamed thermoplastic articles, e.g., with a foamed core and a non-foamed shell layer that the cost of construction and operation of the apparatus is high because at least two processing machines must be installed and operated, one extruder being necessary for the melt containing the foaming agent while another extruder is used for the melt free of foaming agent. For example, when two extruders are used, then two screw casings, screws and drive means are necessary, as well as individual regulating and control devices for simultaneous feeding from both extruders into the common die.

It is also a known practice to add a foaming agent or so-called blowing agent through a feed line to the polymer melt being worked or mixed in an extruder so as to combine the foaming agent for the first time in the extruder itself. The screw in this type of extruder is provided with a mixing means in the zone or region of the mouth of the feed line. On the outside of the screw casing, there is provided a bypass channel for the melt. The purpose of this construction is to bring the melt and the foaming agent together in a specific mixing zone provided with favorable flow conditions and to intermix them intensively at this point. With this type of screw extruder, however, one can produce only a foamed semifinished product which does not exhibit a solid or non-foamed shell or other layer which will stabilize or increase the strength of the shaped product.

It is further known to force the melt containing a foaming agent through an extrusion die and immediately thereafter to cool the initially hollow extruded body in a cooled sizing device which acts to calibrate or size from outside, i.e., by pressing on the outer shell or layer of the extruded body. By this procedure there is obtained a so-called structural foam semifinished article (see, for example, British Pat. No. 1,184,688). The melt then foams up inside the sizing device to provide a foamed core structure. Through the outer cooling and sizing, there is obtained at the same time an outer layer with a considerably denser or almost solid structure. This process is usable only if the foaming agent is added to the plastic in solid form prior to any processing, because a solid foaming agent has much less tendency to expand during the processing of the melt than does a liquid or gaseous foaming agent. The disadvantage in this instance is the so-called "drumming up" of the foaming agent on a thermoplastic granulate before the polymer is charged into the screw extruder. Moreover, because the thermoplastic polymer is mixed with the foaming agent at the very beginning of the processing, it is impossible to branch off or separate a partial melt stream free of foaming agent for the purpose of forming non-foamed shell layers.

One object of the present invention is to provide a process which makes it possible to produce partially foamed thermoplastic articles having a solid profile with a foamed core and a non-foamed shell or outer layer or, a solid profile with a non-foamed core and a foamed shell, or to provide a hollow profile with non-foamed outer and inner layers in combination with a foamed middle layer or on the other hand with a non-foamed middle layer in combination with a foamed outer and inner layer. Moreover, it is an object to achieve this result with addition of a liquid or gaseous foaming agent by continuous screw extrusion in such a manner that construction and operating costs are considerably lower than in known processes.

These and other objects or advantages of the invention for the extrusion of a so-called structural foam from a molten thermoplastic polymer will become more apparent upon consideration of the following detailed specification.

The process of the invention is one which, as is known, requires the production of a partially foamed thermoplastic polymer product having a core and shell layered structure by means of the addition of a foaming agent during continuous extrusion of the polymer with a screw extruder. The particular improvement of this invention comprises the steps of first melting the thermoplastic polymer free of foaming agent and conveying the resulting melt under compression through a first screw zone of the extruder, dividing the melt free of foaming agent into at least two separate partial melt streams for individual conveyance from the first extrusion zone into a die shaping zone of the extruder, introducing and uniformly mixing the foaming agent into at least one of said separate partial melt streams in a second screw zone of the same extruder while maintaining at least one other of said separate partial melt streams free of said foaming agent during conveyance to said die shaping zone, and recombining the individual melt streams in said die shaping zone while expanding said foaming agent to form abutting foamed and non-foamed extruded layers of the core and shell structure.

The apparatus according to this invention is generally intended for continuously extruding the thermoplastic polymer melt into the desired partially foamed structural product from conventional extrusion die means adapted to receive at least one partial melt stream containing a foaming agent and at least one other partial melt stream free of foaming agent for common extrusion. Thus, the extrusion openings of the die means can be of the usual design with a central or axial opening of circular cross-section encircled by one or more concentric annular gaps or openings adapted to bring the foamed and non-foamed melt streams together in contiguous or abutting relationship once the pressure on the melts is reduced sufficiently to permit the foaming agent to expand. Such conventional dies do not constitute an inventive element of the present invention, and this is likewise true of the usual shaping or calibrating dies which can be conveniently assembled onto the die containing the extrusion orifices or openings.

Within this setting, the apparatus of the invention essentially provides the desired single extruder which comprises a screw extruder having a feed entry at one end and a discharge outlet at the opposite end in fluid connection with said extrusion die means, a rotatable conveying screw for transporting said thermoplastic polymer as a melt through said extruder to said extrusion die means, said conveying screw including first and second axially adjacent screw conveying stages arranged on either side of an enlarged screw segment of substantially reduced screw channel depth as compared to the screw channel depth of said adjacent screw conveying stages, the land and core surfaces of said enlarged screw segment and said second screw conveying stage together with the inner cylindrical bore surface of the extruder forming one of said partial melt streams leading to the common extrusion die means, at least one by-pass conduit forming another of said partial melt streams leading directly to said common extrusion die means from a region at the end of said first conveying stage directly before said enlarged screw segment, and inlet means to introduce a foaming agent into one of the partial melt streams leading to said common extrusion die means.

The invention is described in particular details with the aid of the accompanying drawings in which similar parts are designated by the same reference numeral and in which.

Figure 2:
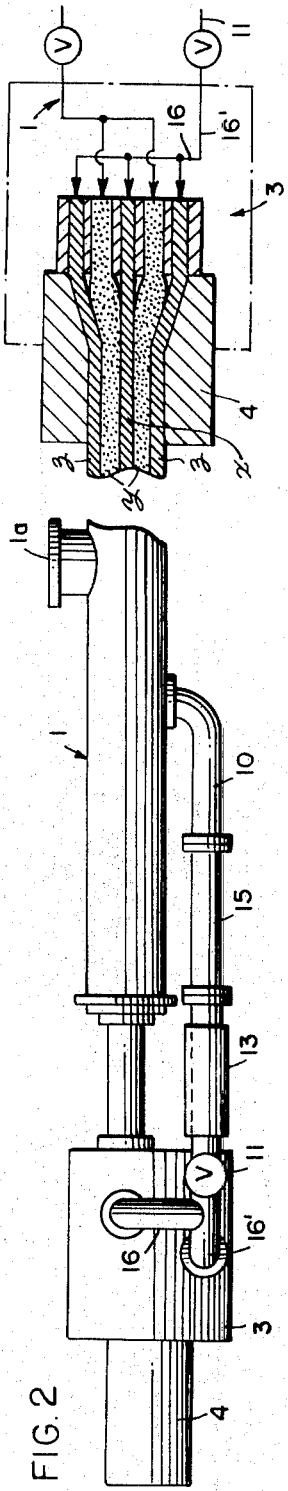
FIG. 2 is a partly schematic top plan view of another screw extruder with an outer by-pass conduit situated on the extruder casing, this conduit being branched at the point of connection to the extrusion die.
Figure 5:
Figure 3:
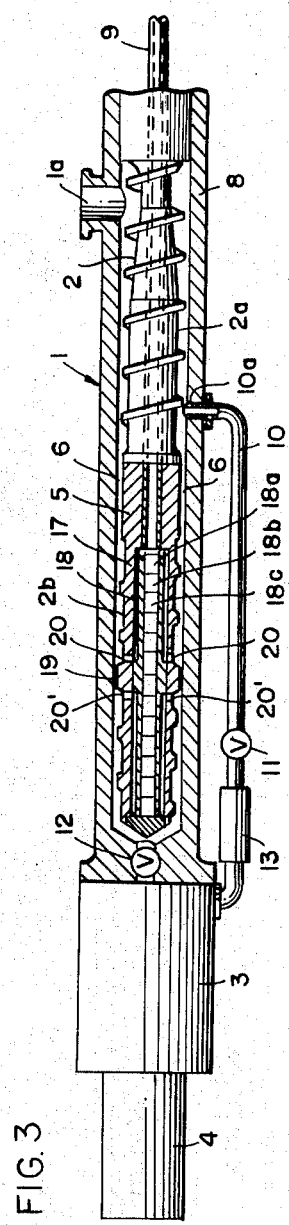
Figure 4A:
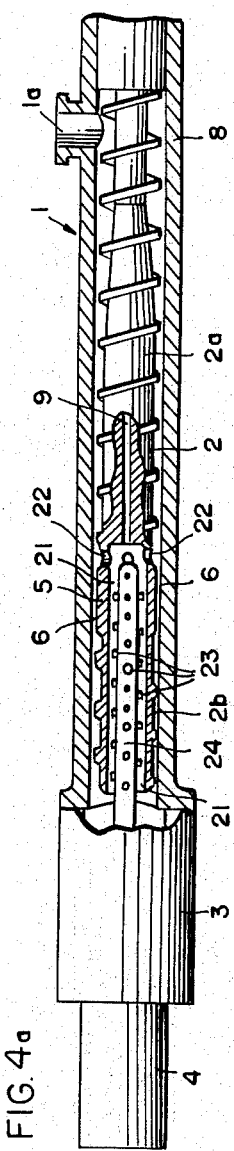
Figure 4B:
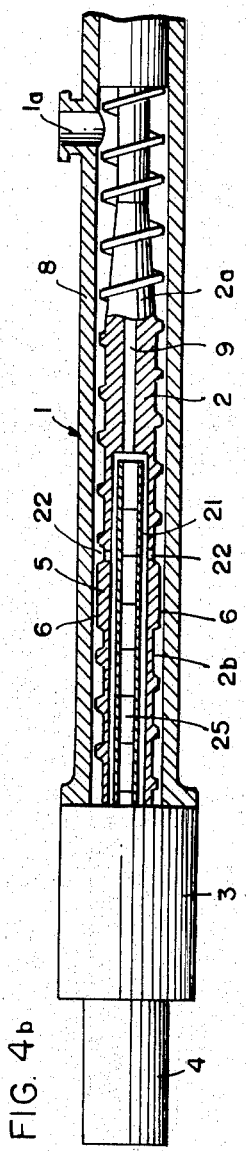

FIG. 3 is a partly schematic top plan view in exposed cross-section to show an extruder having a two-stage hollow screw equipped with a static mixing device, with a screw segment of reduced channel volume between the screw stages and with an outer by-pass conduit for the melt free of foaming agent as well as an axial pipe line entering from the feed end of the extruder to introduce a fluid foaming agent;

FIG. 4a is another partly schematic and largely sectional view of a hollow screw in an elongated extruder wherein the screw segment of reduced channel volume is in the form of an enlarged portion of the screw core combined with an interior by-pass channel or conduit arranged at the discharge end of the screw with another axial pipe line from the feed end for the addition of the foaming agent, an expeller or mixing element being fixed within the hollow end of the screw;

FIG. 4b is a modified form of the screw extruder according to FIG. 4a having a static mixer arranged in the interior by-pass channel; and FIG. 5 is a schematic and sectional view along the axis of the extrusion and sizing dies to further illustrate the branched by-pass conduit of FIG. 2.

The screw extruder 1 comprises at least a two-stage screw 2, the first stage being designated as 2a and the second stage as 2b. The extrusion die 3 is connected in a conventional manner at the discharge end of the screw while the calibrating or sizing die follows immediately thereafter in the usual manner. Both extrusion and sizing dies are included herein within the meaning of extrusion die means. Between the screw stages 2a and 2b there is provided an enlarged screw segment 5 which can be threaded or simply a collar or sleeve-like enlargement of the screw core, the channel volume or thread depth between the screw land being considerably less at this segment or bridging member 5 than the channel volume or thread depth in the two screw stages 2a and 2b.

According to the embodiments of FIGS. 1a, 1b, 2 and 3, the subdividing or separation of the melt into partial streams takes place at the end of the screw stage 2a after the thermoplastic polymer has been introduced through feed pipe 1a and then transported with melting and under increasing pressure in stage 2a which essentially acts as a compression zone narrowing down to a more uniform metering zone just prior to screw segment 5. A first partial melt stream flows through the channel 6 formed between the screw land surfaces, the screw core surfaces and the inner wall surfaces of the cylinder or casing bore in the screw segment 5 and beyond this segment directly in an enclosed path extending to the extrusion die 3. The size of this partial stream 6 is determined by the reduced channel volume caused by the bridge or segment 5.

To this first partial stream of the melt there is added a liquid foaming agent in screw stage 2b. The feed inlet or pipe line for the addition of the foaming agent is designated by 7 in FIGS. 1a and 1b, and it is connected laterally to the housing or casing 8 to open radially inwardly into stage 2b of the screw extruder. This pipe line for adding the foaming agent is designated by reference numeral 9 in FIG. 3 and is arranged concentrically on the rotational axis of the screw 2 in this particular embodiment as well as in FIGS. 4a and 4b.

A second partial melt stream is branched off through the by-pass conduit 10 or 10' and is disposed as a by-pass either within or outside of the casing 8 of the screw extruder so as to extend up to the extrusion die 3. The outlet 10a for the by-pass is located in the region at the end of the first screw stage 2a and just before the enlarged screw segment or bridge 5. The second partial melt stream forced off by compression through the by-pass 10 or 10' is supplied free of the foaming agent to the extrusion die 3.

The feed inlet 7 or 9 for introduction of the foaming agent preferably opens into a zone of the second screw stage 2b which is sufficiently far removed or remote from the outlet 10a of the by-pass conduit 10. By using conventional metering or dosing devices, the foaming or blowing agent can always be carefully added so as to achieve a predetermined or controlled expansion of the polymer and a very uniform foam of the final product, especially where good mixing is assured. Either gaseous or liquid foaming agents can be introduced and mixed with the melt being processed.

The screw segment 5 provided between the two screw stages 2a and 2b is so dimensioned in its length that the required pressure is built up at the end of the first stage 2a, by reason of which a portion of the melt is forced to flow through the by-pass conduit 10, and at the same time, this pressure level is sufficient to prevent flowing back of the foaming agent through channel 6 into the first screw stage 2a. A reduction in the core diameter in the zone of the inlet 7 also tends to prevent a return of melt or foaming agent due to a corresponding pressure drop at this region.

A regulating valve 11 located in by-pass 10, and another regulating valve 12 is provided at the discharge end of the extruder over which one can control the rate at which the melt containing the foaming agent is supplied to the extrusion die 3.

Heating devices 13 can be positioned along the external by-pass 10, for example, by providing electrical heating sleeves or double jacket steam lines or the like.

Figure 1A:
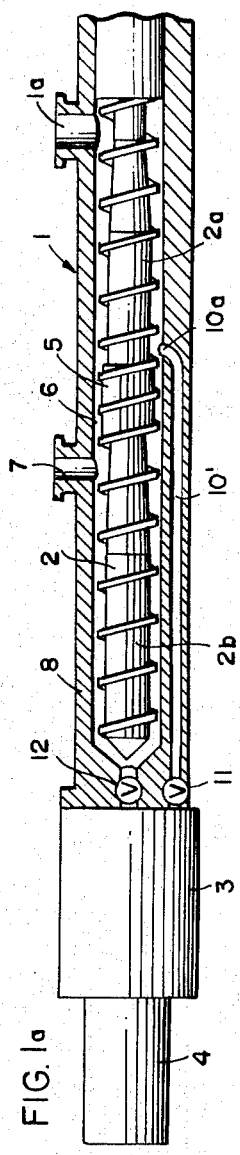
FIG. 1a is a top plan view of a two stage screw extruder, partly schematic and largely in longitudinal section, to illustrate the interior of the screw including a by-pass conduit or duct in the barrel or casing wall of the extruder and an enlarged screw segment of reduced channel volume and thread depth between the two stages.
Figure 1B:
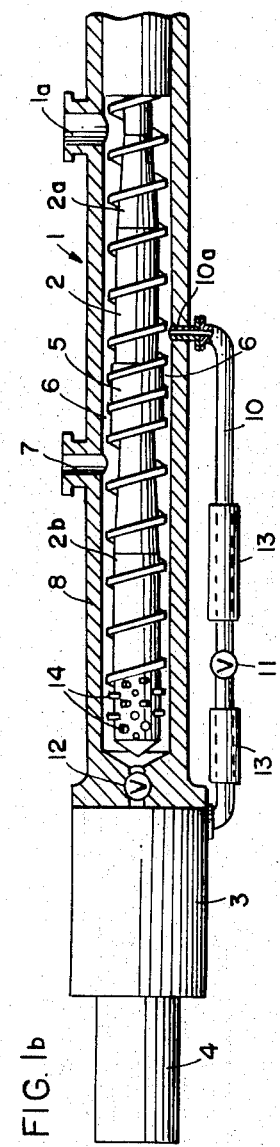
FIG. 1b is a modified embodiment of the screw extruder according to FIG. 1a with an outer or external by-pass conduit arranged on the extruder casing.

The embodiment according to FIG. 1b further exhibits a screw 2 which is constructed at the charge end with a mixing device in the form of radially projecting pins or lugs 14 of cylindrical shape. Through such pins or lugs, one can achieve an intensive and thorough mixing of the melt with the foaming agent and a very uniform distribution of the foaming agent in the polymer melt as well as a more favorable temperature distribution. Because the tip or discharge portion of the screw rotates with the pins 14 following in a circular pattern, this can be referred to as a dynamic mixing means. The embodiment according to FIG. 2 contains a static mixer 15 arranged directly in the by-pass conduit 10. Such a static mixer is conventional and preferably consists of a number of axially sequential and joined stationary guide elements or baffles that are offset against one another. Such a static mixer can also be provided between the discharge end of the screw extruder 1 and the extrusion die 3. The outer by-pass conduit 10 for transporting the melt free of foaming agent is provided with branch lines 16 and 16'. This arrangement as only indicated in FIG. 2 can be used for an extrusion die 3 in which a hollow or tubular profile can be formed, for example, one which has an intermediate foamed core layer and non-foamed inner and outer shell layers, i.e., a laminated or layered tube in which the annular foamed layer is sandwiched between two relatively rigid and solid inner and outer shell or cover layers. On the other hand, as indicated in FIG. 5, a structural foam article can also be achieved by extruding a solid non-foamed core cylinder $x$ surrounded first by the annular foamed layer or intermediate shell $y$ and then by the outer solid shell layer $z$. The sizing or calibrating tube 4 serves to make certain that each of the layers come into close abutting contact and also adhere well to each other.

The screw extruder according to FIG. 3 has a static type mixer 18 within the hollow axial bore of the screw core 17. The screw 2 in this embodiment is constructed with a compression bead or baffle 19 and with radial bores 20 extending through the screw wall. This serves to greatly elongate the mixing length of the second stage 2b before the melt is discharged to the extrusion die.

The static mixing device 18 which consists of fixed baffles or guide elements 18a, 18b, 18c, etc. secured inside core 17, receives the melt through the bores 20 that are arranged just before the compression bead 19 after this melt has first passed through screw stage 2a. The fluid foaming agent is introduced through the axially arranged feed line 9 directly into mixer 18. The melt and the foaming agent are thus brought together in static mixer 18 and intensively intermixed, such mixes providing an extensive splitting up and recombining of relatively small partial melt streams as is usual with these well known devices.

The melt with the finely distributed foaming agent then flows back out of the mixer 18 at the tip end of the screw and back and up through the bores 20' which are situated directly after the compression bead 19. The melt resumes its normal forward direction toward the screw discharge along the threaded channel of the second part of screw 2b and finally leaves the extruder as the melt containing the foaming agent which is directly conveyed into the extrusion die 3.

When there is mention herein of stationary or fixed baffles or guide elements of the static mixing device 18, this means that such guide elements such as 18a, 18b, 18c are rigidly connected with the screw so that no relative movement occurs between the screw and the mixing device. This does not mean however that the mixing device is at a standstill when the extruder is being operated because the mixer then revolves on the same axis as the screw to which it is fixed.

According to the embodiment shown in FIGS. 4a and 4b, the dividing of the thermoplastic melt into partial melt streams after first passing through stage 2a takes place at the screw segment 5 with one partial stream flowing thereover and the other through the interior by-pass channel 21. The axial pipe line 9 for adding the foaming agent is again arranged concentrically to the screw core. The screw channel of screw stage 2a and the interior by-pass channel 21 are in fluid connection with one another through the radial bores 22 in the wall of the hollow screw core. According to FIG. 4a, a stationary or fixed expeller or displacement body 24 is arranged in the inner by-pass 21 with radially projecting cylindrical pins or lugs 23 which bring about an intensive mixing action. According to FIG. 4b, the static mixer 25 is arranged in the by-pass 21 and is constructed substantially the same as the static mixing device described with reference to FIG. 3 above.

The divided melt flows, on the one hand, as a partial stream free of foaming agent through the course screw channel or thread of screw stage 2b and, on the other hand, as a separate melt stream containing foaming agent through the inner by-pass channel 21 into the extrusion die 3. In this conveying and mixing process, the partial melt stream flowing through the inner by-pass 21 of the screw is uniformly mixed with the foaming agent being added through the pipe line 9.

In addition to heating device 13, it is of course quite practical to adopt any of the usual measures for heating the thermoplastic melt and controlling its temperature as it passes through the extruder, e.g., by using electrical heating bands wrapped around the screw casing or using double walled casings for steam or other heating fluids. Similar heating means are also commonly used for the extrusion die means, i.e., the extruder die 3 and any shaping or sizing die 4.

The design and arrangement of the screw extruder of the invention is advantageous inasmuch as the thermoplastic material is melted up in a first screw stage under sufficient compression that one partial melt stream is branched off and fed directly to the extrusion die. The melt of this partial stream may later correspond to that which forms, for example, the non-foamed shell layer of the product as in FIGS. 1a and 1b. This particular design of the screw is also favorable because the second screw stage has a zone of substantially reduced pressure immediately after the screw segment 5 where the channel volume is much larger, so that the foaming agent can be advantageously added to the second partial melt stream in this zone. The melt of this second partial stream later forms, for example, the foamed core of the product.

At the screw segment or bridging member 5 with considerably reduced screw channel volume, however, one must simultaneously provide a sufficiently lengthwise spacing between the opening 10a of the screw channel transporting the melt free of foaming agent and the mouth of the feed line for the foaming agent, so that this fluid foaming agent cannot flow back into the branched off first partial melt stream which must remain free of foaming agent. The inlet line 7 for the addition of a liquid or gaseous foaming agent is advantageously introduced in this embodiment of the screw extruder on the downstream side of the segment 5 with the reduced screw channel volume, i.e., after this segment 5 as viewed in the direction of melt flow in the screw extruder. Means are easily provided to control the pressure difference created by segment 5 to easily cause the first partial melt stream to flow through the by-pass channel 10 or 10' e.g., through valve 11 and also the clearance provided by the segment 5 as well as its length.

In the preferred embodiments of FIGS. 1a, 1b, 2 and 3, the by-pass conduit for the melt free of foaming agent is present as an outer or external by-pass with respect to the screw. The laterally displaced line or by-pass may thus be arranged either in the outer wall of the screw extruder or in a suitable recess of the cylindrical casing of the extruder or else as a tubular line arranged completely outside the casing of the screw extruder, this latter arrangement being quite easy to clean and maintain.

Furthermore, it is also advantageous to arrange a regulating valve in the central or axial connecting line between the discharge end of the screw extruder and the extrusion die, especially in combination with a static mixer. This regulating valve in the axial connecting line and also in the by-pass line facilitates the overall control of the extrusion apparatus, because through the modification of resistances to flow in the conduit system, the individual flow rates or composition throughputs can be advantageously attuned to one another.

According to the embodiments of FIGS. 4 where the screw of the extruder is constructed with an axial hollow bore up to the nose or point at the end of the screw, the second or mixing stage can be made extremely long in comparison to the first or compression stage so as to achieve an excellent mixing effect, especially where the foaming agent can be fed axially into a static mixer in the hollow bore. The similar arrangements of FIGS. 4a and 4b are suitable variations which also offer the highest possible mixing effect without unduly lengthening the screw extruder itself.

The advantage of the embodiments of FIGS. 4a and 4b resides especially in the fact that one can use screw barrels or casings which are usually mass produced, while for the division of the polymer melt into partial streams, it is merely necessary to provide a hollow worm constructed according to the features shown and described above.

The various extruders of the present invention provide a means of achieving relatively complex structural foams such as that illustrated in FIG. 5a, and it will be apparent that many combinations can be achieved in composite structures which are partly foamed and partly solid. Thus, the invention is not restricted to cylindrical bodies or semi-finished tubular products of circular cross-section, but can also be readily adapted to other shapes and arrangements of a laminated or layered product, such as plates, boards, sheets and the like. Both hollow and profiled extrusions are possible as well as solid partially foamed bodies.

Moreover, the extruders described herein can be employed with a wide range of thermoplastic polymers, including such materials as: polystyrene or styrene copolymers, polyolefins such as polyethylene or polypropylene, linear polyesters or polyamides and the like. The range of useful foaming or blowing agents for expansion of at least one of the partial melt streams is also quite broad, including preferably the various well known gaseous and especially liquid hydrocarbon and chlorinated hydrocarbon foaming agents. Many other gaseous and especially liquid foaming or blowing agents are equally suitable, provided that they are compatible with the thermoplastic polymer and any other additives contained therein such as dyes, pigments, fillers and the like. Liquid blowing agents have the advantage of being easily admixed with the thermoplastic melt without requiring exceptionally high pressures to prevent premature expansion or foaming of the polymer.

For a general discussion of these foaming agents, attention is directed to such standard references as Modern Plastics Encyclopedia, Volume 46, No. 10a, Oct. 1969 (1969–1970 Edition), McGraw Hill Publications, New York, pages 262–265. This same reference on pages 243–247 also provides a brief introduction to a number of known processes for the production of partially foamed extruded thermoplastic materials falling within the general classification of so-called structural foams. The process of the present invention is particularly distinguished by its relative low cost. simple operating procedures and good quality control.

The semi-finished and partially foamed structural products are readily useful in applications where parts must be light in weight, but still reasonably sturdy and resistant to impacts, abrasion and the like. The products of the process according to the invention and thus distinguished by their homogeneous and uniform properties in each of the individual core or shell layers while also achieving good self-adhesion between the abutting or overlaid layers such that the extruded and preferably sized articles have a very integral, cohesive and strong character in a comparatively lighweight structure.

I claim:

1. In an apparatus for continuously extruding a thermoplastic polymer melt into a partially foamed structural product from extrusion die means adapted to receive at least one partial melt stream containing a foaming agent and at least one other partial melt stream free of foaming agent for common extrusion, the improvement which comprises:

a screw extruder having a feed entry at one end and a discharge outlet at the opposite end in fluid connection with said extrusion die means;

a rotatable conveying screw for transporting said thermoplastic polymer as a melt through said extruder to said extrusion die means, said conveying screw including first and second axially adjacent screw conveying stages arranged on either side of an enlarged screw segment of substantially reduced screw channel depth as compared to the screw channel depth of said adjacent screw conveying stages, the land and core surfaces of said enlarged screw segment and said second screw conveying stage together with the inner cylindrical bore surface of the extruder forming one of said partial melt streams leading to the common extrusion die means;

at least one by-pass conduit forming another of said partial melt streams leading directly to said common extrusion die means from a region at the end of said first conveying stage directly before said enlarged screw segment; and inlet means to introduce a foaming agent into one of the partial melt streams leading to said common extrusion die means.

2. Apparatus as claimed in claim 1 wherein said by-pass conduit is connected as an external pipe line with respect to the screw.

3. Apparatus as claimed in claim 1 wherein said by-pass conduit is connected as a fluid line running through the cylindrical casing wall of the screw extruder.

4. Apparatus as claimed in claim 1 wherein said by-pass conduit is constructed as a tubular delivery pipe arranged outside the cylindrical casing of the extruder.

5. Apparatus as claimed in claim 1 wherein said inlet means to introduce the foaming agent is in fluid connection with said second screw conveying stage to enter laterally through the cylindrical casing of the extruder.

6. Apparatus as claimed in claim 1 wherein said rotatable screw is hollow with said inlet means to introduce the foaming agent being in fluid connection with said second screw conveying stage through a pipe line extending axially of the rotatable screw from the feed end thereof.

7. Apparatus as claimed in claim 6 wherein a stationary displacement body is mounted to extend axially into a hollow melt channel at the discharge end of the rotatable screw.

8. Apparatus as claimed in claim 1 wherein said rotatable screw is hollow to provide an inner channel for the melt containing the foaming agent, said channel being open at the discharge end of the screw while also being in fluid connection with said first screw conveying stage by means of radially directed bores through the core wall of the hollow screw.

9. Apparatus as claimed in claim 8 wherein a stationary displacement body is mounted to extend axially into said inner channel.

10. Apparatus as claimed in claim 9 wherein said stationary displacement body is an expeller means to discharge melt from said inner channel into said extrusion die means.

11. Apparatus as claimed in claim 9 wherein said stationary displacement body contains radially projecting pins on its outer surface as mixing elements.

12. Apparatus as claimed in claim 8 wherein a static mixing element is mounted within said inner channel of the hollow screw.

13. Apparatus as claimed in claim 1 wherein said screw at its discharge end contains a dynamic mixing means rotating with the screw.

14. Apparatus as claimed in claim 1 including valve regulating means to control the melt flow and pressure in each of said partial melt streams.

15. Apparatus as claimed in claim 1 including a static mixing means arranged between the discharge end of the screw and said extrusion die means.

16. Apparatus as claimed in claim 1 wherein said rotatable screw is hollow to provide an inner channel in which there is mounted a static mixing means for a melt containing said foaming agent, said second screw conveying stage including a compression bead intermediate the length of said second stage with radially transverse bores in the wall of the hollow screw both immediately before and immediately after said bead.

17. Apparatus as claimed in claim 2 wherein said by-pass conduit contains a static mixing means.

18. Apparatus as claimed in claim 1 wherein said by-pass conduit is branched for fluid connection with two different concentric extrusion openings of the extrusion die means.

19. Apparatus as claimed in claim 1 including heating means for said by-pass conduit to control the temperature of melt delivered to said extrusion die means.

* * * * *

UNITED STATES PATENT OFFICE
CERTIFICATE OF CORRECTION

Patent No. 3,782,870             Dated January 1, 1974

Inventor(s) Heinz Schippers

It is certified that error appears in the above-identified patent and that said Letters Patent are hereby corrected as shown below:

First page, left-hand column, twelfth line, "2108936" should read -- P 21 08 936.1 --.

Column 5, line 16, "charge" should read -- discharge --.

Column 8, line 51, "lighweight" should read -- lightweight --.

Signed and sealed this 22nd day of October 1974.

(SEAL)
Attest:

McCOY M. GIBSON JR.                C. MARSHALL DANN
Attesting Officer                  Commissioner of Patents